(12) United States Patent
Totaro et al.

(10) Patent No.: US 10,153,671 B2
(45) Date of Patent: Dec. 11, 2018

(54) PERMANENT MAGNET ROTOR WITH INTRUSION

(71) Applicant: Philip Totaro, Santa Barbara, CA (US)

(72) Inventors: Philip Totaro, Santa Barbara, CA (US); Fang Deng, Novi, MI (US); Ghanshyam Shrestha, Northville, MI (US); Seong T. Lee, Lexington, KY (US)

(73) Assignee: Philip Totaro, Houston, TX (US)

( * ) Notice: Subject to any disclaimer, the term of this patent is extended or adjusted under 35 U.S.C. 154(b) by 214 days.

(21) Appl. No.: 15/074,368

(22) Filed: Mar. 18, 2016

(65) Prior Publication Data

US 2016/0204664 A1  Jul. 14, 2016

Related U.S. Application Data

(63) Continuation-in-part of application No. 13/559,323, filed on Jul. 26, 2012, now abandoned, which is a continuation-in-part of application No. 13/559,330, filed on Jul. 26, 2012, now abandoned.

(60) Provisional application No. 61/581,605, filed on Dec. 29, 2011, provisional application No. 61/581,599, filed on Dec. 29, 2011.

(51) Int. Cl.
*H02K 1/27* (2006.01)
*H02K 7/18* (2006.01)

(52) U.S. Cl.
CPC .............. *H02K 1/276* (2013.01); *H02K 7/183* (2013.01); *H02K 2213/03* (2013.01)

(58) Field of Classification Search
CPC ........................................................ H02K 1/276
See application file for complete search history.

(56) References Cited

U.S. PATENT DOCUMENTS 7,091,643 B2   8/2006   Burgbacher
7,282,827 B2  10/2007   Futami
(Continued)

*Primary Examiner* — Dang Le
(74) *Attorney, Agent, or Firm* — Eric L. Lane; Green Patent Law

(57) ABSTRACT

Exemplary embodiments advantageously enable use of the structure of an interior magnet machine to emulate the function of a synchronous reluctance machine. In exemplary embodiments, a rotor for an electric machine, comprises a first magnet, a second magnet, a first non-magnetic region located between a first end of the first magnet and a second end of the second magnet, the first non-magnetic region having a first magnetic permeability value, a second non-magnetic region located radially between the first magnet and an edge of the rotor, the second non-magnetic region having a second magnetic permeability value, the second magnetic permeability value being relatively lower than the first magnetic permeability value, and an intrusion extending radially from an edge of the rotor and into the first non-magnetic region. An azimuthal width of one of the non-magnetic regions is larger than the azimuthal width of the other non-magnetic region. In exemplary embodiments, the intrusion has at least one magnetic portion. In exemplary embodiments, the intrusion also has at least one non-magnetic portion. The intrusion could be completely non-magnetic, partially magnetic, or completely magnetic. The intrusion could be multi-segmented.

8 Claims, 7 Drawing Sheets

(56) References Cited

U.S. PATENT DOCUMENTS

| | | | |
|---|---|---|---|
| 7,420,306 B2* | 9/2008 | Park | H02K 29/03 310/156.57 |
| 7,777,382 B2 | 8/2010 | Aota et al. | |
| 7,868,502 B2* | 1/2011 | Lee | H02K 1/276 310/156.48 |
| 7,960,886 B2* | 6/2011 | Miura | H02K 1/2766 310/156.57 |
| 8,089,190 B2 | 1/2012 | Lee et al. | |
| 8,212,447 B2 | 7/2012 | Fukuda et al. | |
| 8,598,763 B2* | 12/2013 | Aota | H02K 1/2766 310/156.53 |
| 9,041,268 B2* | 5/2015 | Tomohara | H02K 1/2766 310/156.53 |
| 2003/0080642 A1 | 5/2003 | Mori et al. | |
| 2004/0217666 A1 | 11/2004 | Mellor et al. | |
| 2007/0152527 A1 | 7/2007 | Yura et al. | |
| 2007/0252467 A1 | 11/2007 | Hoemann et al. | |
| 2009/0026865 A1 | 1/2009 | Aota et al. | |
| 2009/0206691 A1 | 8/2009 | Aota et al. | |
| 2009/0212652 A1 | 8/2009 | Nakamasu et al. | |
| 2010/0001607 A1 | 1/2010 | Okuma et al. | |
| 2010/0026128 A1 | 2/2010 | Ionel | |
| 2010/0119390 A1 | 5/2010 | Baba et al. | |
| 2010/0166575 A1 | 7/2010 | Fukuda et al. | |
| 2013/0169101 A1* | 7/2013 | Deng | H02K 1/276 310/156.53 |

\* cited by examiner

PERMANENT MAGNET ROTOR WITH INTRUSION

CROSS REFERENCE TO RELATED APPLICATIONS

This application is a continuation-in-part of and claims priority to U.S. patent application Ser. No. 13/559,323, filed Jul. 26, 2012, which is a non-provisional of and claims priority to U.S. Provisional Patent Application No. 61/581,605 filed Dec. 29, 2011. This application is a continuation-in-part of and claims priority to U.S. patent application Ser. No. 13/559,330, filed Jul. 26, 2012, which is a non-provisional of and claims priority to U.S. Provisional Patent Application No. 61/581,599, filed Dec. 29, 2011, each of which is hereby incorporated by reference in its entirety.

BACKGROUND

The present application generally relates to improving operation of a rotor for a permanent magnet machine.

SUMMARY

In some implementations, a rotor for an electric machine, such as an electric generator, is provided. The rotor may include a magnetic field producing portion. The rotor may also include a non-magnetic region located radially between the magnetic field producing portion and an edge of the rotor.

In some implementations, the rotor may include a first magnet and a second magnet. The rotor may also include a non-magnetic region located between a first end of the first magnet and a second end of the second magnet. The rotor may further include an intrusion extending into the non-magnetic region.

In some implementations, a rotor structure is provided that is configured to increase reluctance torque, the rotor structure including an intrusion in a non-magnetic region that is located between two magnets.

In some implementations, the rotor may include a rotor portion generally having the shape of a disk. The disk may have a plurality of magnetic field producing portions equally spaced about the periphery of the disk. Each magnetic field producing portion may include at least one magnet and two ends. A first end of a first magnetic field producing portion may be adjacent to a second end of a second magnetic field producing portion. A first non-magnetic region may be located between the first end of the first magnetic field producing portion and the second end of the second magnetic field producing portion. A second non-magnetic region may be located radially between the first magnetic field producing portion and an edge of the rotor.

In all of the disclosed implementations, the rotor structure may be configured to block direct axis flux from a stator armature without reducing main magnetizing flux from a magnet inside the rotor.

Exemplary embodiments of a rotor for an electric machine comprise a first magnetic field generating portion having a first end and a second end and including a first magnet having a north magnetic pole and a south magnetic pole, the north and south magnetic poles lying along a radial direct axis of the first magnet. A second magnetic field generating portion has a first end and a second end and includes a second magnet having a north magnetic pole and a south magnetic pole. The north and south magnetic poles lie along a radial direct axis of the second magnet, the magnetic field generating portions block direct axis flux from a stator armature without reducing main magnetizing flux from a magnet inside the rotor. A first non-magnetic region is located between the first end of the first magnetic field generating portion and the second end of the second magnetic field generating portion. A second non-magnetic region may be located radially between the first or second magnet and an edge of the rotor, the non-magnetic regions being oriented such that their radial sides are at the same radius as adjacent magnets to minimize leakage flux by detouring flux to flow around the non-magnetic regions and decrease harmonic flux. One or more of the first and second non-magnetic regions may have a reduced relative magnetic permeability value compared to the relative magnetic permeability values of surrounding magnetic regions.

In exemplary embodiments, the first non-magnetic region is an electrically non-conductive region. The first non-magnetic region may be a hole in the rotor. In exemplary embodiments, the first non-magnetic region is filled with epoxy. The first non-magnetic region may approximate a tear-drop shape. The rotor may further comprise a magnetic region located between the first non-magnetic region and the edge of the rotor. The rotor may further comprise a magnetic region located between the first magnet and the first non-magnetic region. In exemplary embodiments, the rotor further comprises a third non-magnetic region located radially between the first or second magnet and an air gap located between the rotor and a stator armature.

In exemplary embodiments, the first non-magnetic region is a hole in the rotor, and the second non-magnetic region is a hole in the rotor. The rotor may further comprise a first magnetic region located between the first non-magnetic region and the edge of the rotor, and a second magnetic region located between the second non-magnetic region and the edge of the rotor. The rotor may further comprise a fourth magnetic region located between the second magnet and the second non-magnetic region. In exemplary embodiments, the rotor further comprises a third non-magnetic region located between the first magnet and the second magnet. The rotor may further comprise a magnetic region located between the first magnet and the second magnet. The edge may be configured to be located adjacent to a gap that is adjacent to a stator.

In exemplary embodiments, a rotor for an electric machine comprises a rotor portion generally having the shape of a disk, the disk has a plurality of magnetic field producing portions equally spaced about the periphery of the disk, and each magnetic field producing portion including at least one magnet having a north magnetic pole and a south magnetic pole. The north and south magnetic poles may lie along a radial direct axis of the at least one magnet, and each magnetic field producing portion may have two ends, a first end of a first magnetic field producing portion being adjacent to a second end of a second magnetic field producing portion, a first non-magnetic region being located between the first end of the first magnetic field producing portion and the second end of the second magnetic field producing portion, a second non-magnetic region located radially between the first magnetic field producing portion and an edge of the rotor. In exemplary embodiments, the non-magnetic regions are oriented such that their radial sides are at the same radius as adjacent magnets to detour and confine flux to flow around the non-magnetic regions. One or more of the first and second non-magnetic regions has a reduced relative magnetic permeability value compared to the relative magnetic permeability values of surrounding magnetic regions.

In exemplary embodiments, the rotor comprises a third non-magnetic region located radially between the second magnetic field producing portion and an edge of the rotor. The second non-magnetic region may be an electrically non-conductive region. The second non-magnetic region may be a hole in the rotor. In exemplary embodiments, the second non-magnetic region is filled with epoxy. In exemplary embodiments, the second non-magnetic region approximates a tear-drop shape. The rotor may further comprise a magnetic region located between the second non-magnetic region and the edge of the rotor. The rotor may further comprise a magnetic region located between the first magnetic field producing portion and the second non-magnetic region. The first non-magnetic region may be generally a trapezoidal shape.

Exemplary embodiments of a rotor structure comprise at least one magnetic field generating portion blocking direct axis flux from a stator armature without reducing main magnetizing flux from a magnet inside the rotor. The magnet has a north magnetic pole and a south magnetic pole, and the north and south magnetic poles lie along a radial direct axis of the at least one magnet. At least one non-magnetic region is located adjacent the magnetic field generating portion, and the non-magnetic region is oriented such that its radial sides are at the same radius as adjacent magnets to minimize leakage flux by detouring and confining flux to flow around the at least one non-magnetic region. In exemplary embodiments, the at least one non-magnetic region has a reduced relative magnetic permeability value compared to the relative magnetic permeability values of surrounding magnetic regions.

In exemplary embodiments, a rotor for an electric machine comprises a magnet, a non-magnetic region located adjacent to the magnet, and an intrusion extending into the non-magnetic region and dividing the non-magnetic region into two airwalls. The intrusion is sized, shaped, and oriented to increase reluctance torque of the electric machine by decreasing direct axis synchronous inductance of the electrical machine. The non-magnetic region may be an electrically non-conductive region. The non-magnetic region may be a hole in the rotor. The non-magnetic region may be filled with epoxy. In exemplary embodiments, the intrusion is formed of a magnetic material. In exemplary embodiments, the intrusion is formed of electrically conductive material. In exemplary embodiments, the intrusion extends across the non-magnetic region in a radial direction. The non-magnetic region may have a first region adjacent to a first azimuthal side of the intrusion and a second region adjacent to a second azimuthal side of the intrusion. The rotor may be positioned relative to a stator to form a gap between an edge of the rotor and the stator, the intrusion extending radially from the edge of the rotor into the gap. In exemplary embodiments, the rotor further comprises a second non-magnetic region located radially between the magnet and an edge of the rotor. The rotor may further comprise a magnetic region located between the non-magnetic region and the edge of the rotor.

In exemplary embodiments, a rotor for an electric machine having an edge configured to be located adjacent to an air gap that is adjacent to a stator comprises a first magnet, a second magnet, a first non-magnetic region located between a first end of the first magnet and a second end of the second magnet, the first non-magnetic region having a first magnetic permeability value, and a second non-magnetic region located radially between the first magnet and an edge of the rotor. The second non-magnetic region has a second magnetic permeability value relatively lower than the first magnetic permeability value. An intrusion extends radially from the edge and into the first non-magnetic region, the intrusion being sized, shaped, and oriented to increase reluctance torque of the electric machine by decreasing direct axis synchronous inductance of said electrical machine. An azimuthal width of one of the non-magnetic regions is larger than the azimuthal width of the other non-magnetic region.

In exemplary embodiments, one or more of the first non-magnetic region and the second non-magnetic region is an electrically non-conductive region. One or more of the first non-magnetic region and the second non-magnetic region may be a hole in the rotor. One or more of the first non-magnetic region and the second non-magnetic region is filled with epoxy. In exemplary embodiments, the intrusion is formed of a magnetic material. In exemplary embodiments, the intrusion is formed of an electrically conductive material. The first non-magnetic region may have a first region adjacent to a first azimuthal side of the intrusion and a second region adjacent to a second azimuthal side of the intrusion. The rotor may further comprise a third non-magnetic region located radially between the second magnet and the edge of the rotor.

Exemplary embodiments of a rotor structure are configured to decrease direct axis synchronous inductance and increase reluctance torque. In exemplary embodiments, the rotor structure includes an intrusion in a non-magnetic region that is located between two magnets, the intrusion dividing the non-magnetic region into two airwalls such that direct axis synchronous inductance is minimized while quadrature axis synchronous inductance is kept intact.

Exemplary embodiments advantageously enable use of the structure of an interior magnet machine to emulate the function of a synchronous reluctance machine. In exemplary embodiments, a rotor for an electric machine, comprises a first magnet, a second magnet, a first non-magnetic region located between a first end of the first magnet and a second end of the second magnet, the first non-magnetic region having a first magnetic permeability value, a second non-magnetic region located radially between the first magnet and an edge of the rotor, the second non-magnetic region having a second magnetic permeability value, the second magnetic permeability value being relatively lower than the first magnetic permeability value, and an intrusion extending radially from an edge of the rotor and into the first non-magnetic region. An azimuthal width of one of the non-magnetic regions is larger than the azimuthal width of the other non-magnetic region. In exemplary embodiments, the intrusion has at least one magnetic portion. In exemplary embodiments, the intrusion also has at least one non-magnetic portion. In exemplary embodiments, the intrusion has at least one non-magnetic portion. In exemplary embodiments, the intrusion also has at least one magnetic portion. The intrusion could be completely non-magnetic, partially magnetic, or completely magnetic. The intrusion could be multi-segmented.

An exemplary method of controlling flux in the rotor of an electric machine comprises providing a first magnet and a second magnet, providing a first non-magnetic region located between a first end of the first magnet and a second end of the second magnet, the first non-magnetic region having a first magnetic permeability value, providing an intrusion extending radially from an edge of the rotor and into the first non-magnetic region, and providing a second non-magnetic region located radially between the first magnet and an edge of the rotor, the second non-magnetic region having a second magnetic permeability value, the second magnetic permeability value being relatively lower than the first magnetic permeability value. The intrusion channels the flux of the rotor to achieve a maximum direct axis flux and a minimum leakage flux for the pair of first and second magnets. In exemplary embodiments, the intrusion has at least one magnetic portion. In exemplary embodiments, the intrusion also has at least one non-magnetic portion. In exemplary embodiments, the intrusion has at least one non-magnetic portion. In exemplary embodiments, the intrusion also has at least one magnetic portion. The intrusion could be completely non-magnetic, partially magnetic, or completely magnetic. The intrusion could be multi-segmented. The method includes tuning to control the flux that goes through the intrusion, including through magnetic and non-magnetic portions.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

The drawings described herein are for illustration purposes only and are not intended to limit the scope of the present disclosure in any way.

It should be understood that throughout the drawings, corresponding reference numerals indicate like or corresponding parts and features.

DETAILED DESCRIPTION

Figure 1:
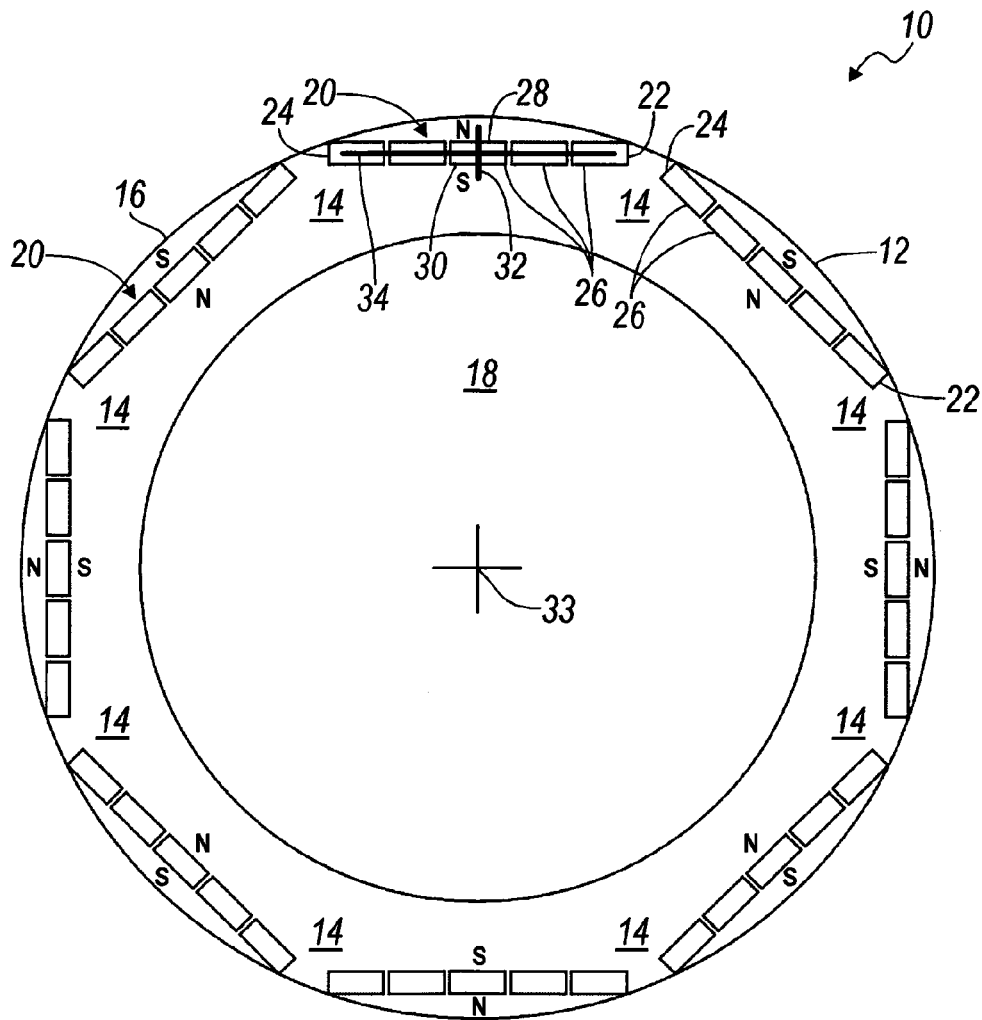
FIG. 1 is a front view of an embedded permanent magnet machine with eight excitation magnetic field generating portions.

The term "about" or "generally" used herein with reference to a shape or quantity includes variations in the recited shape or quantity that are equivalent to the shape for an intended purpose or function.

A permanent magnet machine may be embodied as either a non-salient machine or a salient machine. The salient machine may have a quadrature axis electromagnetic circuit provided to increase output power. In general, a generator is a device that generates electric power by an interacting electromagnetic force between a rotational part (rotor) and a stationary part (stator). The rotor may include an electromagnet (e.g. field coil) around a rotor-core, or permanent magnets on the surface or inside rotor-core to provide rotational magnetic flux, for example. The stator may include an armature coil around a stator core, for example. The magnet in the rotor may induce electric voltage in the armature coil of the stator.

One class of generators includes permanent magnet synchronous machines, which includes both the non-salient and salient types differing principally in the relative utilization of the two components of torque. The two components include the fundamental alignment torque (electromechanical torque) and the second harmonic reluctance torque. The reluctance torque is a function of the saliency ratio e.g. a ratio of quadrature axis synchronous inductance (Lq) to direct axis synchronous inductance (Ld), as is known in the art. In a non-salient machine—typically having surface mount magnets—Ld is nearly equal to Lq, thus the saliency ratio is close to 1. Accordingly, the reluctance torque is negligible. However, intrusion of core material in the quadrature axis will increase the saliency ratio, therefore, increasing the reluctance torque and total output torque.

Permanent magnet synchronous machines may be used in electric vehicle applications. However, conventional interior permanent magnet ("IPM") machines used in such an application typically possess a saliency ratio that is under 1. IPM machines with a saliency ratio well under 1 can suffer from performance degradation in the machine, such as high rotor inertia, cogging torque, underperformance of power factor, torque ripple, as well as high manufacturing cost due to dependence on permanent magnets with a significant concentration of rare earth materials to provide the proper flux characteristics.

Permanent magnet synchronous machines may also be used in wind turbine applications. In these applications, the permanent magnet synchronous machines may be connected to the grid with a back to back converter and the maximum voltage the generator can produce may be limited by the rating of the capacitor of the converter. The requirement for over voltage conditions can, therefore, be very strict, requiring the generator open circuit voltage to be very low compared to the generator terminal voltage. Surface mount machines are simple in construction and make better use of permanent magnets compared to IPM machines. However, surface mount machines have less flexibility with regard to the operating point compared to the IPM machines. In a surface mount machine, Ld and Lq values are almost equal, therefore the same voltage requirement mentioned will lead to large current and low power factor. Due to the contribution of the reluctance torque, IPM machines may require lower current to produce the same output torque/power. So maximizing reluctance torque may be important for IPM machine design. Selecting the correct d & q axis electromagnetic circuits leads to higher ratio of Lq to Ld.

If the structure of the IPM machine could be designed so that it exhibits the behavior of a synchronous reluctance machine, then some of that performance degradation can be offset. Accordingly, the disclosed configurations may increase the output torque for an IPM machine by introducing an intrusion into the air gap to maximize Lq. The disclosed configurations may also introduce an air wall to minimize Ld while keeping Lq intact. The size, shape and orientation of the intrusions can channel flux in a fashion which improves machine efficiency, power density, power factor while reducing cogging torque and mitigating other harmonic effects. Different types of ferritic and non-ferritic material may be used in the intrusions to tune the machine performance.

A rotor lamination structure of an embedded permanent magnet synchronous machine is provided for reducing cogging torque, reducing magnet loss, and improving output power by including an air-hole between a permanent magnet of the rotor and an edge of the rotor. In addition, the rotor may have a quadrature axis air-hole.

In general, a generator is a device that generates electric power by an interacting electromagnetic force between a rotational part (rotor) and a stationary part (stator). The rotor may include an electromagnet (e.g. field coil) around a rotor-core, or permanent magnets on the surface or inside rotor-core to provide rotational magnetic flux, for example. The stator may include an armature coil around a stator core, for example. The magnet in the rotor may induce electric current in the armature coil of the stator.

Permanent magnet synchronous machines may experience magnetic loss caused by eddy currents. Eddy currents are generated due to the fluctuation of the magnetic-flux. This fluctuation is due to both slotting in stator structure (space harmonics) and non-sinusoidal current (time harmonics) flow in the stator coils.

This magnetic loss can cause temperature rise in the permanent magnets, resulting in reduced magnetic force from the permanent magnets, leading possibly to irreversible demagnetization of the permanent magnets and a significant decline of the generator overall output power.

Also, the high magnetic force of permanent magnets may cause cogging torque in the machine. Cogging torque is an undesirable feature of permanent magnet machines at starting and/or low speed operation where low frequency mechanical harmonics are introduced for vibration.

In general, magnet loss resides mainly in the region close to air-gap where the harmonic flux penetrates (measured in skin depth) and generates eddy currents. The easiest way to reduce magnet loss is to place magnets away from the air-gap. However, this will cause significant increase in magnetic flux leakage from magnets and the size of the machine and/or size and number of magnets need to be increased accordingly. The configurations disclosed may block the direct axis flux from the stator armature without reducing the main magnetizing flux from a permanent magnet inside the rotor.

The type and rating of magnets can also have an impact on the operational performance of the machine. High flux density and thermal rating of the magnets is oftentimes introduced to overcome design constraints on the geometry and manufacturing cost of the machine. The nature of the present invention is to enable the use of magnets which are rated lower than those which are used in a conventional IPM machine of similar construction. The nature and arrangement of the intrusions is intended to enable the aforementioned benefits to be achieved while mitigating the drawbacks of conventional IPM machine designs and the prior art.

FIG. 1 illustrates a rotor 10 for an electric machine, such as an electric generator. The electric machine may be an embedded permanent magnet synchronous machine. The rotor 10 may be inside a stator. However, in other implementations, the rotor 10 may be situated outside the stator. In other implementations, the rotor 10 may also be part of a surface mount machine or a semi surface mount machine. The rotor 10 may include a plurality of stacked rotor portions each shaped as a disk or generally shaped as a disk 12. Throughout each disk 12, the rotor 10 may include a magnetic region 14 that extends to an edge 16 (e.g. outer surface) of the rotor 10. The magnetic region 14 may be made of laminated steel or other magnetic materials. The interior 18 of the rotor 10 is not shown, but may include components necessary for proper operation of the electric generator.

The rotor 10 may have eight excitation magnetic field generating portions 20 (e.g. poles) disposed in holes (e.g. banks) of the disks 12. However, any number of excitation magnetic field generating portions 20 may be used. The magnetic region 14 may surround the excitation magnetic field generating portions 20 to protect the excitation magnetic field generation portions 20 from centrifugal forces during rotation of the rotor 10, and from other forces.

Each excitation magnetic field generating portion 20 may have a first end 22 and a second end 24. A first end 22 of each excitation magnetic field generating portion 20 may be adjacent to a second end 24 of an adjacent excitation magnetic field generating portion 20.

Each excitation magnetic field generating portion 20 may have five segmented magnets 26 arrayed in a row and positioned in plane with the rotor 10. However, one or any number of magnets 26 may be used in each excitation magnetic field generating portion 20. As such, the array of magnets 26 in a row may, based on mechanical and/or manufacturing considerations, comprise a smaller or larger number than five segments. The magnets 26 may be permanent magnets, electromagnets (for example, a coil through which current is varied, thereby generating a magnetic field), or any other devices that generate magnetic fields, for example.

Each magnet 26 has a north and south magnetic poles 28, 30 that may lie along a radial direct axis 32 of the magnet 26. The radial direction may, for example, extend between the center 33 of the rotor 10 and the edge 16 of the rotor 10. Each magnet 26 also may define a quadrature axis 34, which may define an azimuthal boundary line between the north and south magnetic poles 28, 30, and which may be perpendicular to the respective direct axis 32 of the magnet 26. The azimuthal direction may, for example, extend circumferentially around the rotor, for example along a direction that passes through each of the magnetic generating portions 20. The azimuthal direction may be perpendicular to the radial direction.

Each of the magnets 26 in a given excitation magnetic field generating portion 20 may have identically oriented north and south magnetic poles 28, 30. Additionally, each excitation magnetic field generation portion 20 may have oppositely oriented north and south magnetic poles 28, 30 relative to an adjacent excitation magnetic field generating portion 20. Thus, the orientations of the north and south magnetic poles 28, may alternate around the entire circumference of the rotor 10. This is possible if there is an even number of excitation magnetic field generating portions 20. If the magnets 26 are permanent magnets, then respective magnetizations of each excitation magnetic field generating portions 20 (and their constituent permanent magnets) may alternate between radially outward and radially inward around the circumference of the rotor 10.

Figure 2:
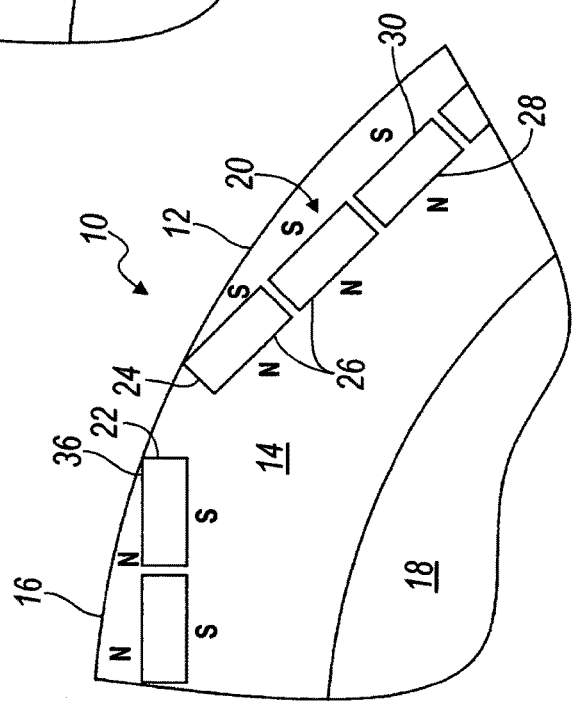
FIG. 2 is a front view of two excitation magnetic field generating portions in a rotor of the permanent magnet machine.

FIG. 2 illustrates a magnified view of the rotor 10, showing excitation magnetic field generating portions 20 near the edge 16 of the rotor 10. Corners 36 of the excitation magnetic field generating portions 16 may be located as close as possible to the edge 16 to minimize leakage flux from the magnets 26. However, the corners 36 may be main areas of magnet loss concentration due to their locations relative to the edge 16. For example, the corners 36 are the nearest to the stator to receive penetration of harmonic flux.

Figure 3A:
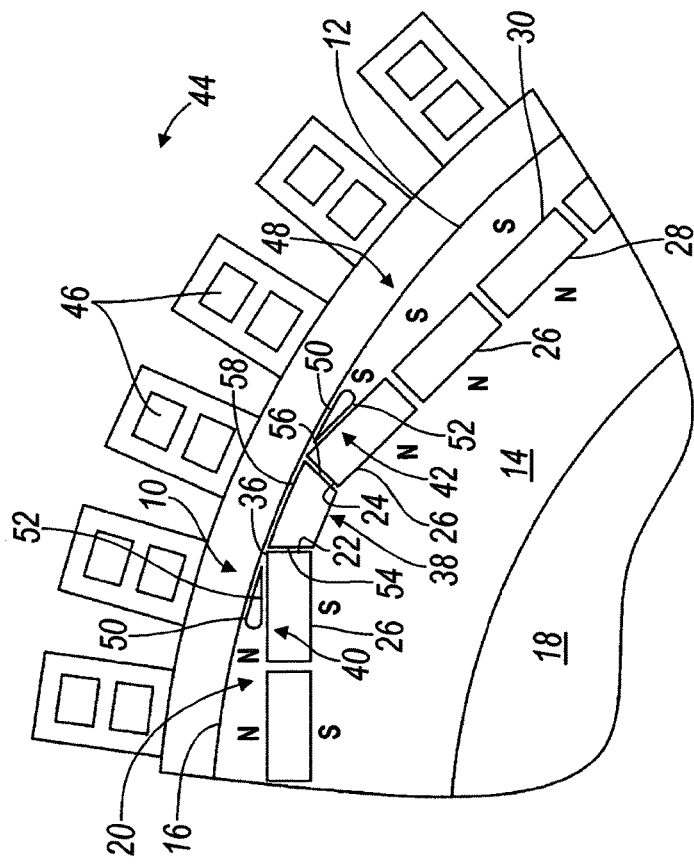
FIG. 3A is a front view of two excitation magnetic field generating portions in a rotor with non-magnetic regions to improve magnetic characteristics of the permanent magnet machine.

FIG. 3A illustrates a magnified view of the rotor 10 in an implementation having a number of non-magnetic regions 38 and non-magnetic portions 40, 42 introduced into the rotor lamination. FIG. 3A also shows a stator 44 surrounding the rotor 10, armature coil windings 46 of the stator 44, and a gap 48 (e.g. air gap) located between the rotor 10 and the stator 44.

In an exemplary embodiment, a first non-magnetic region 38 (e.g. a quadrature axis air hole) may be located between (e.g. azimuthally between) a first end 22 of a first excitation magnetic field generating portion 20 and the second end 24 of a second excitation magnetic field generating portion 20. Further, second and third non-magnetic portions 40, 42 may respectively be located radially between the edge 16 and respective radial sides of respective magnets 26 of excitation magnetic field generating portions 20 (e.g. above corners 36 of the magnets 26).

The second and third non-magnetic portions 40, 42 may also respectively be located radially between the gap 48 and respective radial sides of respective magnets 26 of excitation magnetic field generating portions 20 (e.g. above corners 36 of the magnets 26). Thus, the edge 16 may be configured to be located adjacent to the gap 48, which may be adjacent to the stator 44.

The first, second, and/or third non-magnetic region 38 and portions 40, 42 may be non-ferromagnetic regions, non-conductive regions, electrically non-conductive regions, a hole in the rotor, or filled with a non-magnetic material such as epoxy, for example. The epoxy also serves the function to restrain the magnet poles and intrusion assemblies in place under high torque loading. The first, second, and/or third non-magnetic region 38 and portions 40, 42 may have relative magnetic permeability values (μ/μ0) of 1, about 1, or about the relative magnetic permeability value of air, for example. In some implementations, the first, second, and/or third non-magnetic region 38 and portions 40, 42 may instead be slightly magnetic regions having reduced relative magnetic permeability values compared to the relative magnetic permeability values of the surrounding magnetic regions 14 which are made of laminated steel. Further, as shown in FIG. 3A, the first non-magnetic region 38 may have a trapezoidal shape or generally have a trapezoidal shape, and the second and/or third non-magnetic region 38 and portions 40, 42 may be have a tear-drop shape or generally have a tear-drop shape.

However, in other implementations, the first, second, and/or third non-magnetic region 38 and portions 40, 42 may have other shapes, for example a polygon or generally a polygon, triangle or generally a triangle, quadrilateral or generally a quadrilateral, square or generally a square, rectangle or generally a rectangle, pentagon or generally a pentagon, a hexagon or generally a hexagon, an octagon or generally an octagon, a circle or generally a circle, an oval or generally an oval, a teardrop or generally a teardrop, a trapezoid or generally at trapezoid, or an irregular shape.

Moreover, in some implementations, the first, second, and/or third non-magnetic region 38 and portions 40, 42 may each be split into two, three, four, or more non-magnetic regions that are spaced apart from each other by parts of the magnetic region 14. For example, the first, second and/or third non-magnetic region 38 and portions 40, 42 may be comprised of two, three, four, or more radially spaced apart non-magnetic regions, or two, three, four, or more azimuthally spaced apart non-magnetic regions, or a 2×2 grid of non-magnetic regions 38. In particular, the non-magnetic region 38 may, for example, be optimized to increase reluctance torque by including an intrusion.

In some implementations, the non-magnetic region 38 and portions 40, 42 may be surrounded by the magnetic region 14 of the rotor 10. As such, a first part 50 of the magnetic region 14 may be located between the non-magnetic region 40, 42 and the edge 16 of the rotor 10. Also, a second part 52 of the magnetic region 14 may be located between the non-magnetic region 40, 42 and a respective radial side of a magnet 26.

Further, a third part 54 of the magnetic region 14 may be located between a first end 22 of a first excitation magnetic field generating portion 20 and a first azimuthal side of the non-magnetic region 38, and a fourth part 56 of the magnetic region 14 may be located between a second end 24 of a second excitation magnetic field generation portion 20 and a second azimuthal side (opposing the first azimuthal side) of the non-magnetic region 38. In other implementations (not shown), opposing azimuthal sides of the non-magnetic region 38 may be flush with the first end 22 of a first excitation magnetic field generating portion 20 and a second end 24 of a second excitation magnetic field generating portion 20. Additionally, a fifth part 58 of the magnetic region 14 may be located between an outer radial side of the non-magnetic region 38 and the edge 16 of the rotor 10. However, in some implementations, the fifth part 58 may be removed, so that an inner radial side of the non-magnetic region 38 may define the edge 16 of the rotor 10.

In the configurations shown, the magnetic flux from the stator 44 can be blocked at the non-magnetic regions 40, 42. Consequently, the higher order harmonic flux from the magnets 26 (e.g. permanent magnets) may be decreased. In the meantime, the fundamental component of the magnet flux from the magnets 26 may increase a little by detouring and confining the flux to flow from both sides around, for example, the non-magnetic portions 40, 42. This reduces flux leakage in the area where the non-magnetic regions 40, 42 would otherwise be absent. As a result, the magnet loss and cogging torque may be significantly reduced due to less penetration and variation of harmonic flux from the stator 44.

Moreover, the non-magnetic region 38 (e.g. quadrature axis air hole) on the quadrature axis 34 may reduce both direct axis and quadrature axis inductances (especially reduction in quadrature axis inductance), and increase power factor of the generator. The non-magnetic region 38 may be optimized for a particular generator to render an overall high output power. The sides of the non-magnetic region 38 facing the magnets 26 in the azimuthal direction may be located close enough to the magnets 26, and the radial sides may be at the same radius as the adjacent magnets 26, to minimize magnet flux leakage and consequently output higher open circuit voltage and higher output power delivery under load.

Although the illustrated d/q structure of non-magnetic regions 38, 40, 42 and magnets 26 may be near an edge 16 of a rotor 10, with the rotor 10 being located inside a stator 44, the present disclosure is meant to encompass other d/q structures as well. For example, the d/q structure of non-magnetic regions 38, 40, 42 and magnets 26 may be near an edge of a rotor 10 and adjacent to the stator 44, with the rotor 10 being outside the stator 44.

Figure 3B:
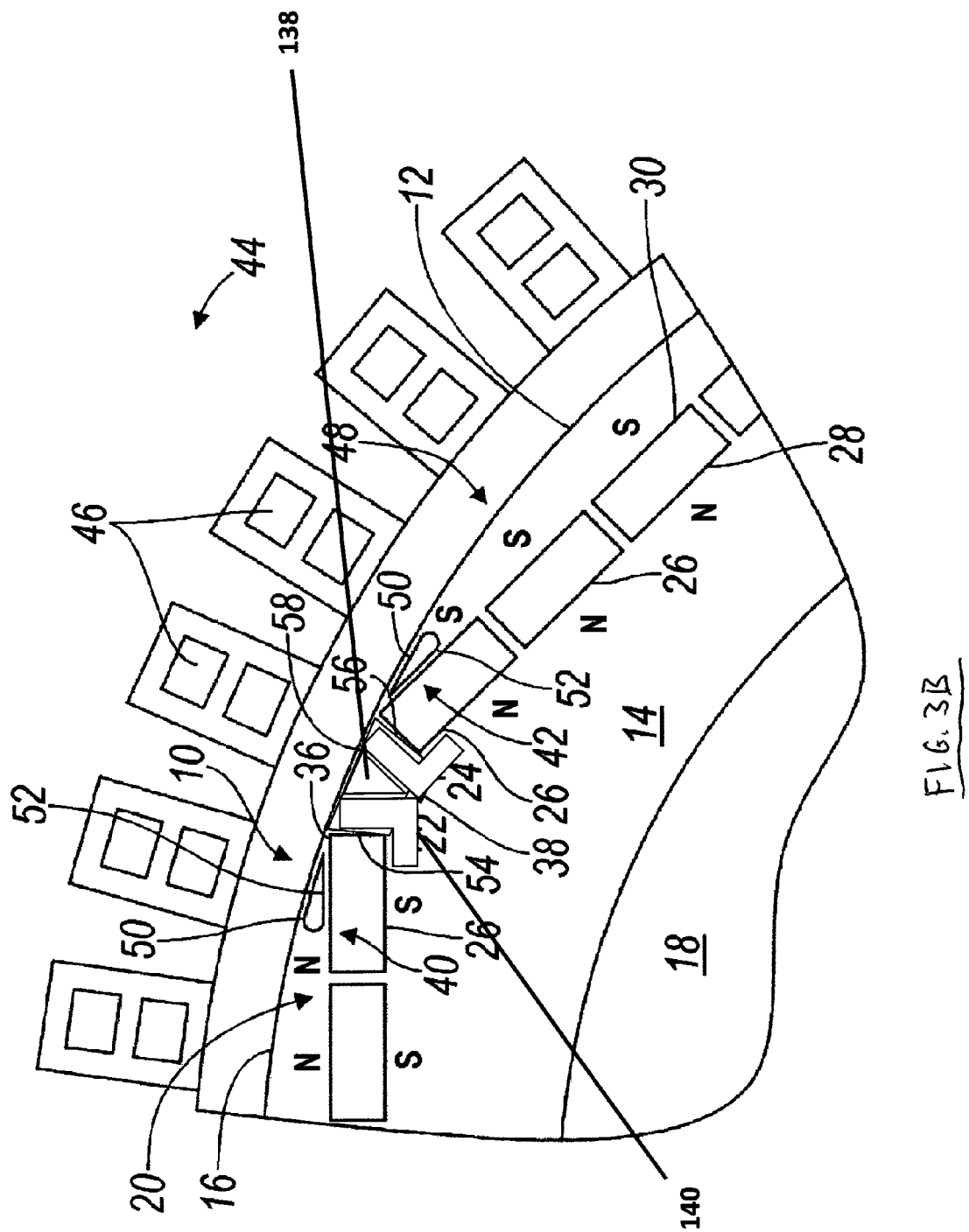
FIG. 3B is a front view of two excitation magnetic field generating portions in a rotor with both magnetic and non-magnetic regions to improve magnetic characteristics of the permanent magnet machine.

In another embodiment shown in FIG. 3B, intrusion portions 138 and 140 may comprise some ferritic material to enable a channeling effect of the electric machine flux, therefore making those portions of the intrusion slightly magnetic between a pair of magnets. The size, shape, and orientation in the intrusions as well as the amount and placement of the ferritic material enables the tuning of the electric machine so that it can achieve a maximum output torque at maximum power with a minimized amount of leakage flux and eddy currents. The desired intent of this structure is for an IPM-based machine to exhibit the performance characteristics of a synchronous reluctance machine with the assistance of the intrusions.

The first and second magnetic portions 138, 140, may have other shapes, for example a polygon or generally a polygon, triangle or generally a triangle, quadrilateral or generally a quadrilateral, square or generally a square, rectangle or generally a rectangle, pentagon or generally a pentagon, a hexagon or generally a hexagon, an octagon or generally an octagon, a circle or generally a circle, an oval or generally an oval, a teardrop or generally a teardrop, a trapezoid or generally at trapezoid, or an irregular shape.

Figure 4:
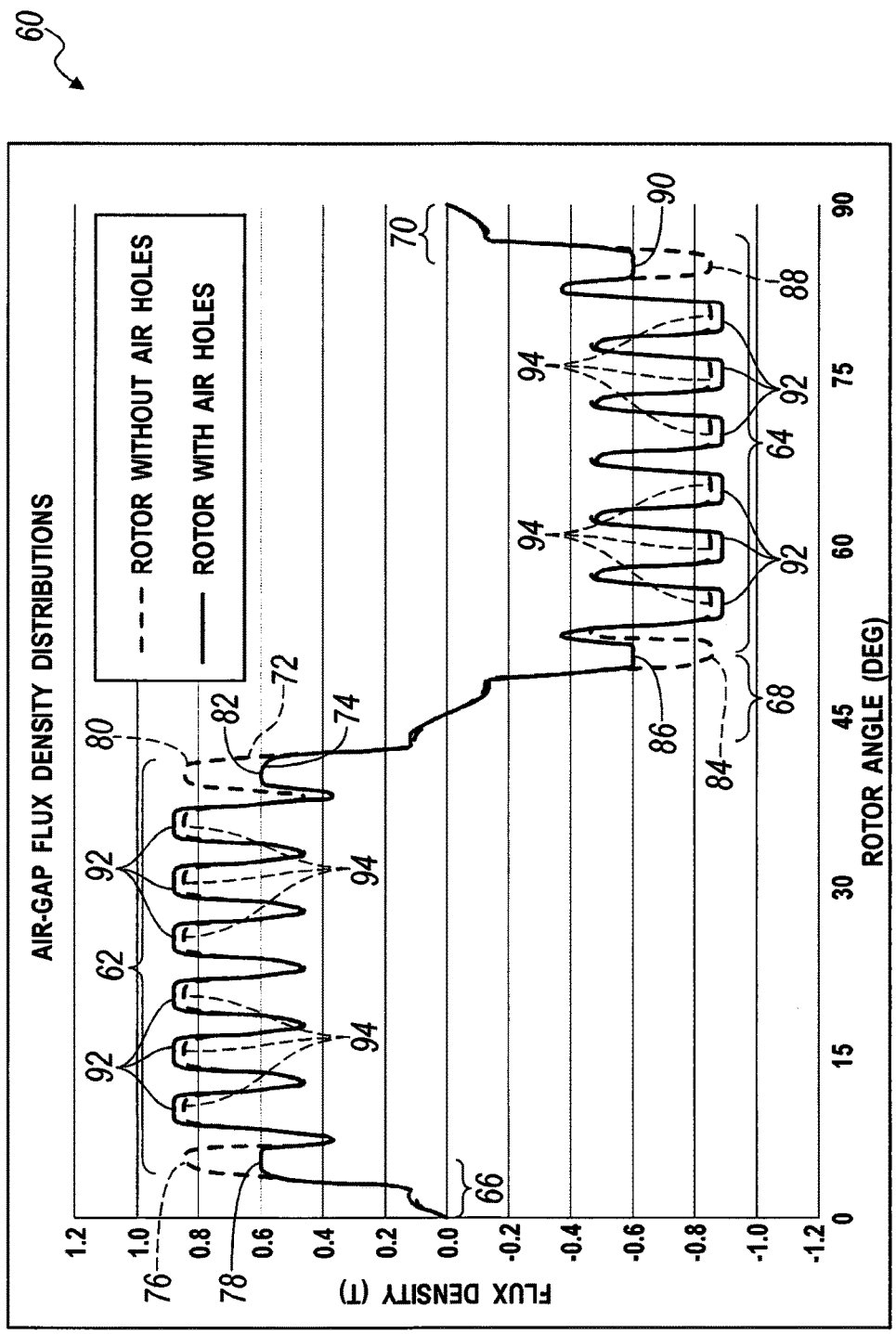
FIG. 4 is a graph of the air-gap flux density for the rotor.
Figure 5:
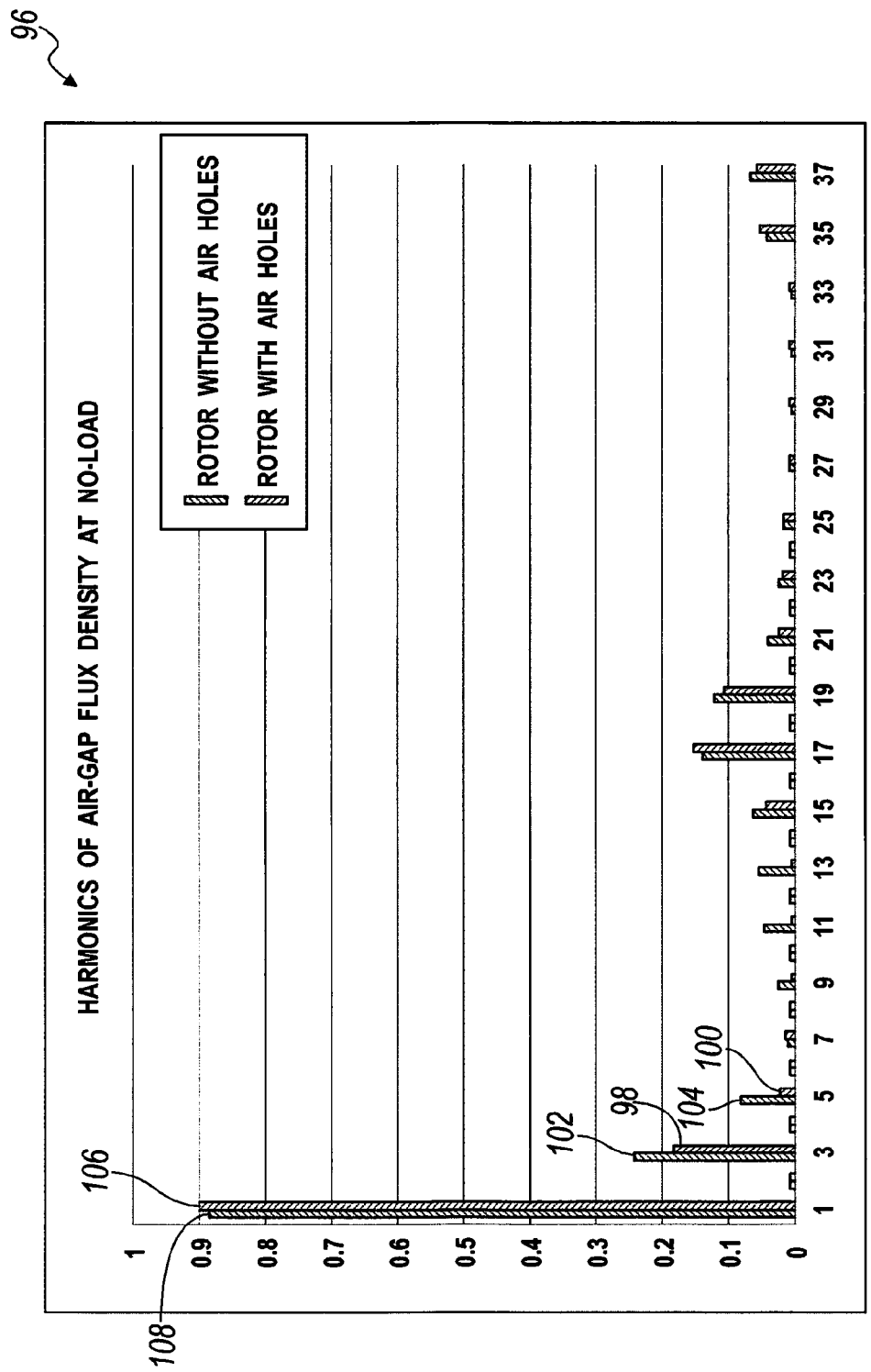
FIG. 5 is a graph of the magnitude of harmonic flux components.

FIGS. 4 and 5 illustrate experimental results for this d/q circuit structure as applied to an embedded permanent magnet generator (EPMG) design with 2.2 MW output at 1700 rpm and a rated torque of 12000 Nm. FIG. 4 illustrates a chart 60 showing electromagnetic analysis results provided for by Finite Elements Method (FEM). The chart regions 62, 64, which are respectively between rotor angles of about 5 to about 40 degrees and rotor angles of about 50 to about 85 degrees, show air-gap flux that may respectively correspond to first and second excitation magnetic field generating portions 20. The chart regions 66, 68, 70, which are respectively between rotor angles of about 0 to about 5 degrees, rotor angles of about 40 to about 50 degrees, and rotor angles of about 85 to about 90 degrees, show air-gap flux that may respectively correspond to three regions, each of which are between first and second ends 22, 24 of excitation magnetic field generating portions 20. The air-gap flux shown in FIG. 4 may repeat three times between about 90 degrees to about 360 degrees, and may correspond to the other six excitation magnetic field generating portions 20 of the rotor 10.

The chart line 72 shows air-gap flux that may correspond to a rotor 10 lacking non-magnetic regions 40, 42. The chart line 74 shows air gap-flux that may correspond to a rotor 10 having non-magnetic regions 40, 42. The respective parts 76, 78 of the chart lines 72, 74 shows air gap-flux that may correspond to a magnet 26 at a first end 22 of the first magnetic generating portion 20. The respective parts 80, 82 of the chart lines 72, 74 shows air gap-flux that may correspond to a magnet 26 at a second end 24 of the first magnetic generating portion 20. The respective parts 84, 86 of the chart lines 72, 74 shows air gap-flux that may correspond to a magnet 26 at a first end 22 of the second magnetic generating portion 20. The respective parts 88, 90 of the chart lines 72, 74 shows air gap-flux that may correspond to a magnet 26 at a second end 24 of the second magnetic generating portion 20. The respective parts 92, 94 of the chart lines 72, 74 shows air gap-flux that may correspond to middle parts of the magnetic generating portions 20.

The parts 78, 82, 86, 90 show, relative to the parts 76, 80, 84, 88, that introducing air holes may reduce air-gap flux (e.g. direct axis flux from the stator 44, higher order harmonic flux from the magnets 26) at ends 22, 24 of magnetic generating portions 20. The parts 92 show, relative to parts 94, that introducing air holes may also cause the fundamental component of magnet flux from the magnets 26 to increase by detouring around the non-magnetic regions 40, 42.

FIG. 5 illustrates a chart 96 showing a comparison of the magnitude of harmonic flux components between two rotors 10, one with the non-magnetic regions 40, 42 implemented as air holes, and one without the non-magnetic regions 40, 42. Near ends 22, 24 of the excitation magnetic field generating portions 20, magnetic flux is reduced, and around the middle of each excitation magnetic field generating portion 20, the flux increases. As shown in FIG. 5, the rotor 10 with non-magnetic regions 40, 42 may have a significantly smaller amount of high order harmonic flux components than a rotor without the non-magnetic regions. For example, the third and fifth harmonic component 98, 100, which are related to cogging torque and return loss, are significantly smaller than corresponding high order harmonic flux components, for example the third and fifth harmonic components 102, 104, of the rotor 10 without non-magnetic regions 40, 42. As a result, the cogging torque is greatly reduced from 1322 N·m to 699 N·m (a 47.1% reduction). Also, the total magnet loss is reduced from 2.32 kW to 1.65 kW (a 28.9% reduction) at the rated output operation. This may be accomplished without reducing the fundamental first (sinusoidal) harmonic. For example, as shown in FIG. 5, the first order harmonic 106 of the rotor 10 with non-magnetic regions 40, 42 may be greater than the first order harmonic flux 108 of the rotor 10 without non-magnetic regions 40, 42. This increased flux may, for example, correspond to the increased flux in the parts 92 of the chart line 72 that may correspond to middle parts of the magnetic generating portions 20. Additionally, as shown in FIG. 5, the seventh through thirty-seventh harmonic flux components may also be affected by introducing the non-magnetic regions 40, 42.

In the meantime, through optimization of the non-magnetic region 38 (e.g. quadrature axis air holes), the leakage flux from the magnet can be minimized to improve open circuit voltage. The applied optimized quadrature axis circuitry may improve the open circuit voltage from 757.3 V to 764.3 V and the expected output may be increased from 2.237 MW to 2.239 MW.

In the configurations shown, the magnetic flux from the stator 44 can be blocked at the non-magnetic regions 40, 42. Consequently, the higher order harmonic flux from the magnets 26 (e.g. permanent magnets) may be decreased. In the meantime, the fundamental component of the magnet flux from the magnets 26 may increase a little by detouring and confining the flux to flow from both sides around, for example, the non-magnetic portions 40, 42. This reduces flux leakage in the area where the non-magnetic regions 40, 42 would otherwise be absent. As a result, the magnet loss and cogging torque may be significantly reduced due to less penetration and variation of harmonic flux from the stator 44.

Figure 6:
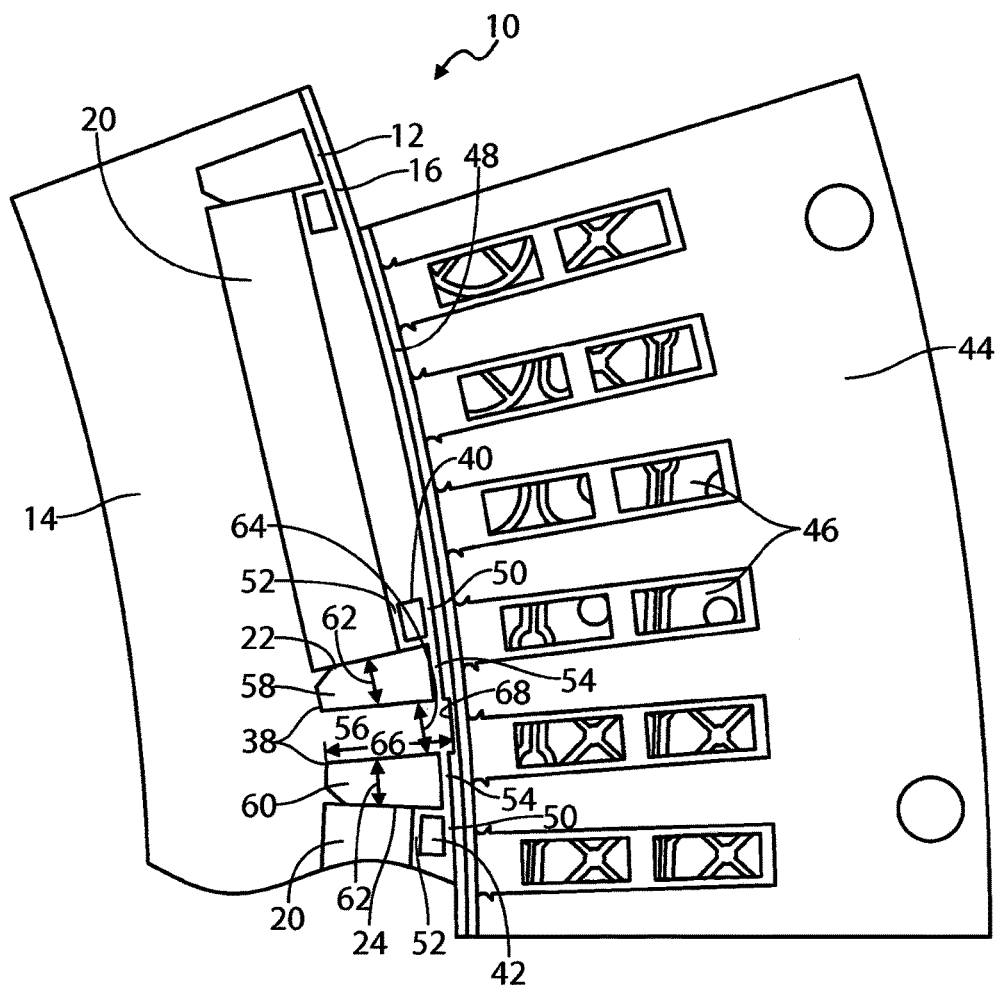
FIG. 6 is a front view of the interior permanent magnet synchronous machine having two excitation magnetic field generating portions in a rotor with an intrusion in a non-magnetic region to improve magnetic characteristics of the magnetic machine.

FIG. 6 illustrates a magnified view of the rotor 10 in an implementation having a number of non-magnetic regions 38, 40, 42 introduced into the rotor lamination. FIG. 6 also shows a stator 44 surrounding the rotor 10, armature coil windings 46 of the stator 44, and a gap 48 (e.g. air gap) located between the rotor 10 and the stator 44. A first non-magnetic region 38 (e.g. a quadrature axis air hole) may be located between (e.g. azimuthally between) a first end 22 of a first excitation magnetic field generating portion 20 and the second end 24 of a second excitation magnetic field generating portion 20. Further, second and third non-magnetic region 40, 42 may respectively be located radially between the edge 16 and respective radial sides of excitation magnetic field generating portions 20 (e.g. above corners of the magnets 26). The second and third non-magnetic region 40, 42 may also respectively be located radially between the gap 48 and respective radial sides of respective magnets 26 of excitation magnetic field generating portions 20 (e.g. above corners 36 of the magnets 26). Thus, the edge 16 may be configured to be located adjacent to the gap 48, which may be adjacent to the stator 44. Although the excitation magnetic field generating portions 20 are shown as a single magnet 26 in FIG. 6 for simplicity, the excitation magnetic field generating portions 20 may have the structure shown in and described with respect to FIG. 1.

The first, second, and/or third non-magnetic regions 38, 40, 42 may be non-ferromagnetic regions, non-conductive regions (e.g. electrically non-conductive regions), a hole in the rotor, or filled with a non-magnetic material such as epoxy, for example. The first, second, and/or third non-magnetic regions 38, 40, 42 may have relative magnetic permeability values ($\mu/\mu 0$) of 1, about 1, or about the relative magnetic permeability value of air, for example. In some implementations, the first, second, and/or third non-magnetic regions 38, 40, 42 may instead be slightly magnetic regions having reduced relative magnetic permeability values compared to the relative magnetic permeability values of the surrounding magnetic regions 14 which are made of laminated steel. Further, as shown in FIG. 6, the first non-magnetic region 38 may have a polygonal (e.g. five-sided) shape or generally have a polygonal (e.g. five-sided) shape, and the second and/or third non-magnetic regions 38, 40, 42 may be have a quadrilateral (e.g. square) shape or generally have a quadrilateral (e.g. square) shape.

However, in other implementations, the first, second, and/or third non-magnetic regions 38, 40, 42, may have other shapes, for example a polygon or generally a polygon, triangle or generally a triangle, quadrilateral or generally a quadrilateral, square or generally a square, rectangle or generally a rectangle, pentagon or generally a pentagon, a hexagon or generally a hexagon, an octagon or generally an octagon, a circle or generally a circle, an oval or generally an oval, a teardrop or generally a teardrop, a trapezoid or generally at trapezoid, or an irregular shape.

Moreover, in some implementations, the first, second, and/or third non-magnetic regions 38, 40, 42 may each be split into two, three, four, or more non-magnetic regions that are spaced apart from each other by parts of the magnetic region 14. For example, the first, second and/or third non-magnetic region 38 and portions 40, 42 may be comprised of two, three, four, or more radially spaced apart non-magnetic regions, or two, three, four, or more azimuthally spaced apart non-magnetic regions, or a 2×2 grid of non-magnetic regions 38.

In some implementations, the non-magnetic region 38 and portions 40, 42 may be surrounded by the magnetic region 14 of the rotor 10. As such, a first part 50 of the magnetic region 14 may be located between the non-magnetic region 40, 42 and the edge 16 of the rotor 10. Also, a second part 52 of the magnetic region 14 may be located between the non-magnetic region 40, 42 and a respective radial side of a magnet 26.

Opposing azimuthal sides of the non-magnetic region 38 may be flush with the first end 22 of a first excitation magnetic field generating portion 20 and a second end 24 of a second excitation magnetic field generating portion 20. In other implementations, a third part of the magnetic region 14 may be located between a first end 22 of a first excitation magnetic field generating portion 20 and a first azimuthal side of the non-magnetic region 38, and a fourth part of the magnetic region 14 may be located between a second end 24 of a second excitation magnetic field generating portion 20 and a second azimuthal side (opposing the first azimuthal side) of the non-magnetic region 38. Additionally, a fifth part 54 of the magnetic region 14 may be located between an outer radial side of the non-magnetic region 38 and the edge 16 of the rotor 10.

The non-magnetic portions 40, 42 may, for example, be optimized to block direct axis flux from the stator armature 46 without reducing main magnetizing flux from the excitation magnetic field generating portions 20 inside the rotor 10.

Additionally, the rotor 10 may include an intrusion 56 (e.g. intruding piece, or extension). The intrusion 56 may divide the non-magnetic region 38 into two regions 58, 60 (e.g. airwalls). The intrusion 56 may be formed of laminated steel, for example. Including the intrusion 56 may change the saliency ratio, and also the direct axis and quadrature axis current requirements for certain terminal voltages. That is, current may be minimized for a given output torque/power by maximizing reluctance torque/power through increase of Lq/Ld ratio. The torque may be a function of the product of saliency ratio and the direct axis and quadrature axis currents.

The configuration having the intrusion 56 and the regions 58, 60 may decrease leakage flux, thus increasing the magnet flux crossing the air gap. The distance between the excitation magnetic field generating portion 20 and the intrusion 56 may be selected to provide maximum torque output. The azimuthal widths 62 of the regions 58, 60 may be changed by adjusting the azimuthal width 64 of the intrusion 56. Smaller azimuthal widths 62 of the regions 58, 60 may create a large leakage of the magnet flux (increased leakage inductance), therefore reducing the fundamental alignment torque. A larger azimuthal width 62 of the regions 58, 60 may reduce the azimuthal width 64 of the intrusion 56, resulting in deeper saturation and reduction of the reluctance torque.

Figure 7:
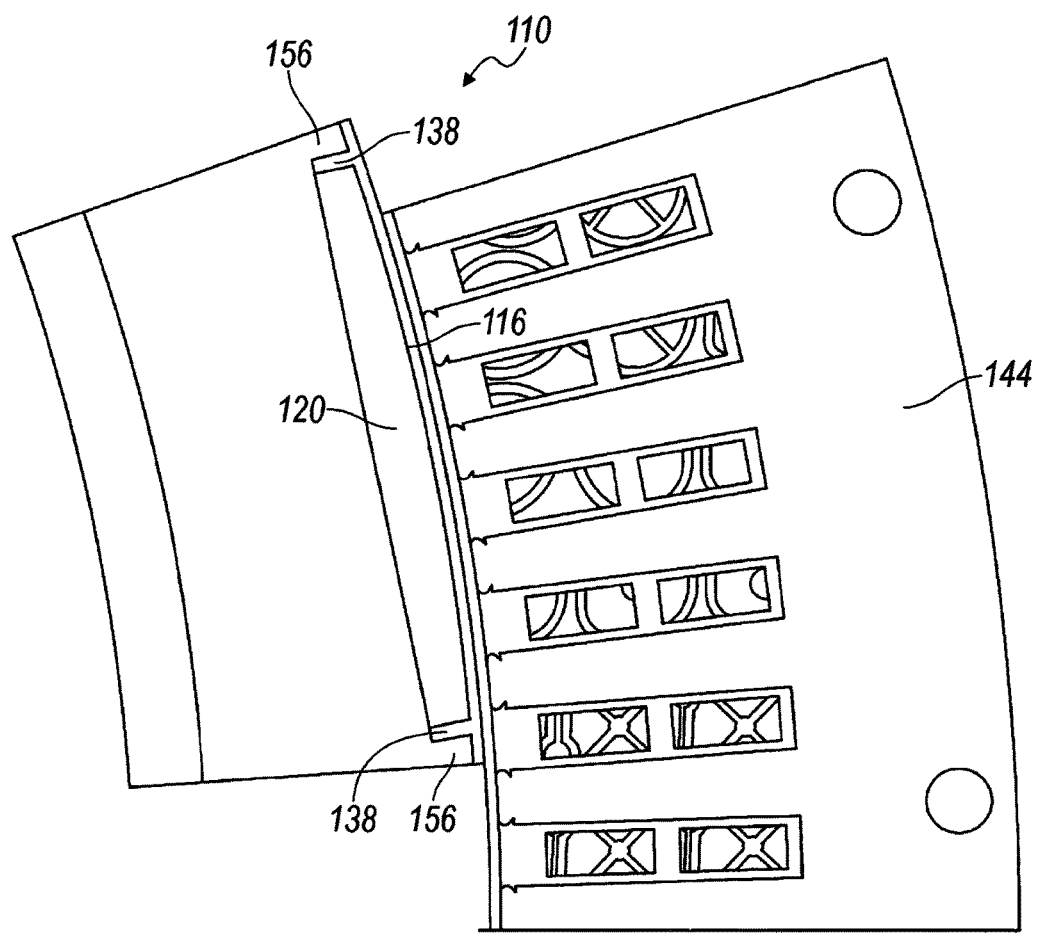
FIG. 7 is a front view of two excitation magnetic field generating portions in another rotor with an intrusion into non-magnetic regions to improve magnetic characteristics of the magnetic machine.

In some implementations, an azimuthal width 62 of one of the regions 58, 60 may be larger than the azimuthal width 62 of another one of the regions 58, 60. A radial length 66 may be defined as beginning at an inward radial side of the non-magnetic region 38, and terminating at the outward radial end 68 of the intrusion. The outward radial end 68 may extend radially beyond the main magnetic portion 14 of the rotor 10, as shown in FIG. 7. Although the outward radial end 68 is shown having a rectangular or substantially rectangular shape, the outward radial end 68 may instead have a rounded shape or substantially rounded shape, or a triangular shape or a substantially triangular pointed shape that points radially outwardly, for example. Additionally, although only one intrusion 56 is shown in FIG. 3A, two, three, four, five, or more intrusions 56 may be included in the non-magnetic region 38 in similar fashion to the one intrusion 56 shown. The choice of the number of intrusions 56 may depend on desired output torque and other characteristics, for example.

Tables 1 and 2 below illustrate analyses showing that introduction of the intrusion 56 in the non-magnetic region 38 has a significant impact on output torque in a 3.3 megawatt IPM machine.

Table 1 illustrates the difference in torque output with variation in azimuthal width of the quadrature axis intrusion 56. This comparison is based on a current of 3040 A rms at full load. As shown, the saliency ratio varies with the width of the regions 58, 60 (e.g. airwalls).

TABLE 1

| Intrusion width | No load | Full load | Average torque | Average power | Ld, Lq (mH) | Saliency ratio |
|---|---|---|---|---|---|---|
| 19 mm | 599 V | 690 V | 90.52 kNm | 3.4125 MW (base) | 0.22, 0.364 | 1.654 |
| 20 mm | 599 V | 690 V | 90.61 kNm | 3.4159 MW (0.1% more) | 0.22, 0.375 | 1.704 |
| 21.2 mm | 599 V | 690 V | 90.82 kNm | 3.4238 MW (0.33% more) | 0.221, 0.384 | 1.7375 |
| 22.2 mm | 599 V | 690 V | 90.7 kNm | 3.4193 MW (0.2% more) | 0.22, 0.39 | 1.7727 |
| 23.2 mm | 599 V | 690 V | 90.75 kNm | 3.4208 MW (0.24% more) | 0.222, 0.389 | 1.75225 |
| 24.2 mm | 599 V | 690 V | 90.87 kNm | 3.4257 MW (0.386% more) | 0.22, 0.39 | 1.7727 |

Table 2 illustrates the difference in torque output with variation in outward radial length of the intrusion 56 into the non-magnetic region 38, assuming a 23.2 mm azimuthal width of the intrusion 56. As shown, the saliency ratio and hence the torque output increases with the increase in the outward radial length of the intrusion 56. With a 1.5 mm intrusion, a 1.16% increase in output power is predicted. Cogging torque and torque ripple values given without a skew in the rotor. With a skew of half slot pitch, the cogging torque value drops to less than 1% and the torque ripple to less than 2 for all cases.

TABLE 2

| Intrusion distance | No load | Full load | Cogging (80 C), no skew | Torque ripple, no skew | Avg. torque | Avg. power | Ld, Lq (mH) | Sal. ratio |
|---|---|---|---|---|---|---|---|---|
| No intrusion | 599 V | 690 V | 3340 (3.82%) <1% after skew | 7200 (8.2%) <2% after skew | 89.7 kNm | 3.3816 MW (base) | 0.221, 0.379 | 1.7149 |
| 1 mm | 599 V | 690 V | 3298 (3.76%) <1% after skew | 9860 (11.26%) <2% after skew | 90.46 kNm | 3.410 MW (0.84% more) | 0.224, 0.392 | 1.75 |
| 1.5 mm | 599 V | 690 V | 3290 (3.76%) <1% after skew | 11380 (13%) <2% after skew | 90.75 kNm | 3.408 MW (1.16% more) | 0.222, 0.389 | 1.75225 |
| 2.2 mm | 599 V | 690 V | 3250 (3.82%) <1% after skew | 13400 (15.3%) <2% after skew | 91.24 kNm | 3.4397 MW (1.72% more) | 0.223, 0.393 | 1.7623 |

FIG. 7 illustrates a magnified view of the rotor 110 in a semi surface mount machine, for example. This implementation may include features similar or identical to the implementation of FIGS. 1 and 6, except for the following differences. The magnetic field producing portion 120 may be an inset magnet that defines the edge 116 of the rotor 110, and therefore there may be no non-magnetic regions analogous to the non-magnetic regions 40, 42. The inset magnet may cause a large loss in the rotor, thus the intrusion 156 may be formed of laminated steel. Further, it is noted that only a portion of the rotor 110 and stator 144 are shown in FIG. 3. The portions shown may be intended to be recur around the circumference of the rotor 110 and stator 114. As such, additional magnetic field producing portions 120 may be located adjacent to the magnetic field producing portion 120 shown.

Table 3 illustrates analyses showing that introduction of the intrusion 156 in the non-magnetic region 138 has a significant impact on output torque in a 3.3 megawatt surface mount or semi surface mount machine. Specifically, Table 3 illustrates various output torques for a surface mount machine and semi surface mount machine with various azimuthal widths between the magnetic field producing portion 120 and the intrusion 156. An azimuthal width distance of 5 mm from the magnetic field producing portion 120 gives the highest output torque. The comparison is based on the dimension of the machine for a power rating of 3.3 megawatts, like the IPM machine. Introduction of a 2 mm intrusion into the non-magnetic region 138 gives even higher torque output for the same current.

TABLE 3

| Inset dimension | Open circuit voltage | Terminal voltage | Total torque | Reluctance torque | Current |
|---|---|---|---|---|---|
| No inset | 599 V | 690 V | 89.665 kNm (base) | 0 | 3270 A |
| Inset with 3 mm airwall | 599 V | 690 V | 90.460 kNm (0.88% more) | 0.795 kNm | 3270 A |
| Inset with 5 mm airwall | 599 V | 690 V | 90.65 kNm (1.086% more) | 0.985 kNm | 3270 A |
| Inset with 7 mm airwall | 599 V | 690 V | 90.590 kNm (1.021% more) | 0.925 kNm | 3270 A |
| Inset with 5 mm airwall with 2 mm intrusion | 599 V | 690 V | 91 kNm (1.467% more) | 1.335 kNm | 3270 A |

Although in FIGS. 6-7, the magnetic regions 38, 138 and the intrusions 56, 156 may be near an edge of a rotor 10, 110, with the rotor 10, 110 being located inside the stator 44, 144, the present disclosure is meant to encompass other structures as well. For example, the non-magnetic regions 38, 138 and intrusions 56, and 156 may be near an edge of a rotor 10, 110 and adjacent to the stator 44, 144, with the rotor 10, 110 being outside of the stator 44, 144.

As a person skilled in the art will readily appreciate, the above description is meant as an illustration of the principles of this application. This description is not intended to limit the scope or application of this invention in that the invention is susceptible to modification, variation and change, without departing from spirit of this application, as defined in the following claims.

What is claimed is:

1. An electric machine, comprising:
   a rotor;
   a stator;
   a first magnet;
   a second magnet;
   a first non-magnetic region located between a first end of the first magnet and a second end of the second magnet, the first non-magnetic region having a first magnetic permeability value;
   a second non-magnetic region located radially between the first magnet and an edge of the rotor, the second non-magnetic region having a second magnetic permeability value, the second magnetic permeability value being relatively lower than the first magnetic permeability value; and
   at least one intrusion extending radially from an edge of the rotor and into the first non-magnetic region;
   wherein an azimuthal width of one of the non-magnetic regions is larger than the azimuthal width of the other non-magnetic region; and
   wherein the first non-magnetic region and the second non-magnetic region block direct axis flux from the stator to the rotor, and the at least one intrusion comprises both magnetic and non-magnetic portions which regulates direct axis flux of the rotor to increase open circuit voltage of the electric machine.

2. The electric machine of claim 1 wherein the intrusion has at least one magnetic portion.

3. The electric machine of claim 2 wherein the intrusion has at least one non-magnetic portion.

4. The electric machine of claim 1 wherein the intrusion has at least one non-magnetic portion.

5. The electric machine of claim 4 wherein the intrusion has at least one magnetic portion.

6. The electric machine of claim 1 wherein an inset magnet defines an edge of the rotor.

7. The electric machine of claim 6 wherein the inset magnet causes a loss in the rotor.

8. A method of controlling flux in an electric machine comprising a rotor and a stator, the method comprising:
   providing a first magnet and a second magnet;
   providing a first non-magnetic region located between a first end of the first magnet and a second end of the second magnet, the first non-magnetic region having a first magnetic permeability value;
   providing at least one intrusion extending radially from an edge of the rotor and into the first non-magnetic region; and
   providing a second non-magnetic region located radially between the first magnet and an edge of the rotor, the second non-magnetic region having a second magnetic permeability value, the second magnetic permeability value being relatively lower than the first magnetic permeability value;
   wherein the first non-magnetic region and the second non-magnetic region block direct axis flux from the stator armature to the rotor and the at least one intrusion comprises both magnetic and non-magnetic portions which regulates direct axis flux of the rotor to increase open circuit voltage of the electric machine.

* * * * *